United States Patent
Landes et al.

(10) Patent No.: US 7,953,535 B2
(45) Date of Patent: May 31, 2011

(54) DRIVE LINE TORQUE PERTURBATION FOR PTO MODE SHIFTING

(75) Inventors: James W. Landes, East Peoria, IL (US); Ryan L. Horihan, Peoria, IL (US); Kevin G. Meyer, Metamora, IL (US); Travis Edward Moore, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 973 days.

(21) Appl. No.: 11/831,738

(22) Filed: Jul. 31, 2007

(65) Prior Publication Data
US 2009/0031699 A1 Feb. 5, 2009

(51) Int. Cl.
G06F 7/00 (2006.01)
G06F 19/00 (2006.01)

(52) U.S. Cl. ............ 701/56; 701/51; 477/174; 477/166; 180/53.1; 475/3; 475/5

(58) Field of Classification Search ............... 701/51, 701/53–56, 67; 475/3, 5; 477/36, 70, 90–91, 477/174, 166; 180/53.1; 60/204
See application file for complete search history.

(56) References Cited

U.S. PATENT DOCUMENTS

| | | | |
|---|---|---|---|
| 2,968,188 A | | 1/1961 | Du Shane et al. |
| 5,103,951 A * | | 4/1992 | Inui et al. ......................... 477/36 |
| 5,237,883 A | | 8/1993 | Churchill et al. |
| 5,557,977 A * | | 9/1996 | Stockton ...................... 74/15.84 |
| 5,666,917 A | | 9/1997 | Fraser et al. |
| 5,682,315 A * | | 10/1997 | Coutant et al. .................. 701/57 |
| 5,740,044 A | | 4/1998 | Ehrenhardt et al. |
| 5,947,860 A | | 9/1999 | Lagein |
| 6,080,081 A | | 6/2000 | Sauermann et al. |
| 6,267,189 B1 | | 7/2001 | Nielsen et al. |
| 7,037,236 B2 * | | 5/2006 | Ishibashi et al. ................ 477/52 |
| 7,128,686 B2 * | | 10/2006 | Hitch et al. ...................... 477/53 |
| 7,344,473 B2 * | | 3/2008 | Ishibashi et al. ................ 477/52 |
| 7,617,892 B2 * | | 11/2009 | Nishimoto et al. .......... 180/53.4 |
| 7,727,114 B2 * | | 6/2010 | Tarasinski et al. ............ 477/110 |
| 7,861,612 B2 * | | 1/2011 | Jeng et al. ....................... 74/335 |

(Continued)

FOREIGN PATENT DOCUMENTS
EP 649998 B1 * 4/1997
(Continued)

OTHER PUBLICATIONS

Control of the geared neutral point in a traction drive CVT; Hebbale, K.; Carpenter, M.; American Control Conference, 2003. Proceedings of the 2003; vol. 3; Digital Object Identifier: 10.1109/ACC.2003. 1243464; Publication Year: 2003 , pp. 2572-2576 vol. 3.*

(Continued)

Primary Examiner — Cuong H Nguyen
(74) Attorney, Agent, or Firm — Leydig, Voit & Mayer

(57) ABSTRACT

A method of controlling a machine drive having a driveline PTO establishes a driveline torque perturbation via conversion of internal inertia through two transmission neutral conditions. In an example, when a request is received, e.g., from an operator, to shift the driveline PTO from a first mode to a second mode, the transmission is automatically modulated between its first neutral condition and its second neutral condition while the driveline PTO is shifted from the first mode to the second mode, thus minimizing torque lock and facilitating mode changes.

20 Claims, 8 Drawing Sheets

U.S. PATENT DOCUMENTS

| | | | |
|---|---|---|---|
| 2004/0209718 A1* | 10/2004 | Ishibashi et al. | 474/18 |
| 2005/0288152 A1* | 12/2005 | Hitch et al. | 477/121 |
| 2006/0172853 A1* | 8/2006 | Ishibashi et al. | 477/52 |
| 2006/0191359 A1* | 8/2006 | Tarasinski et al. | 74/11 |
| 2007/0006572 A1 | 1/2007 | Yu et al. | |
| 2007/0017729 A1* | 1/2007 | Nishimoto et al. | 180/374 |
| 2008/0214348 A1* | 9/2008 | Hasegawa et al. | 475/80 |
| 2008/0236322 A1* | 10/2008 | Jeng et al. | 74/473.11 |
| 2010/0029431 A1* | 2/2010 | Rodgers, II | 475/218 |

FOREIGN PATENT DOCUMENTS

| | | | |
|---|---|---|---|
| EP | 1672236 | | 6/2006 |
| JP | 2001-323495 | * | 10/2001 |
| JP | 2001-323835 | * | 10/2001 |
| JP | 2001-385496 | * | 12/2001 |
| JP | 2005-208575 | * | 7/2005 |
| JP | 2007-13041 | * | 1/2007 |
| JP | 2007-13042 | * | 1/2007 |
| WO | 2007030072 | | 3/2007 |

OTHER PUBLICATIONS

An approach to fault diagnosis of helicopter planetary gears; Wu, B.; Abhinav Saxena; Khawaja, T.S.; Patrick, R.; Vachtsevanos, G.; Sparis, P.; Autotestcon 2004. Proceedings; Digital Object Identifier: 10.1109/AUTEST.2004.1436936 Publication Year: 2004 , pp. 475-481.*

The Application of Multi-domain Physical System Simulation Method in the Study of Automatic Transmissions; Dai Zhenkun; Liu Yanfang; Xu Xiangyang; Wang Shuhan; Software Engineering, 2009. WCSE '09. WRI World Congress on; vol. 2 Digital Object Identifier: 10.1109/WCSE.2009.199; Publication Year: 2009 , pp. 504-508.*

Study on Optimal Design of Planetary Gear Reducer Based on Particle Swarm Algorithm and Matlab; Qimin, Xiao; Qili, Xiao; Semantics Knowledge and Grid (SKG), 2010 Sixth International Conference on; Digital Object Identifier: 10.1109/SKG.2010.67 Publication Year: 2010 , pp. 391-394.*

Wavelet analysis with time-synchronous averaging of planetary gearbox vibration data for fault detection, diagnostics, and condition based maintenance; Makis, V. et al.; Mechanical and Electronics Engineering (ICMEE), 2010 2nd International Conference on; vol. 1; Digital Object Identifier: 10.1109/ICMEE.2010.5558579; pp. V1-132-V1-136.*

Modeling and dynamic simulation of a virtual prototype for applying automobile differential into hybrid electric vehicle as power-slit device; Zeng Xiao-hua et al; Computer Application and System Modeling (ICCASM), 2010 Inter Conf. on; vol. 3; Digital Object Identifier: 10.1109/ICCASM.2010.5620147; Pub. 2010 , pp. V3-82-V3-87.*

Split torque type gearbox fault detection using acoustic emission and vibration sensors; Bechhoefer, E. et al.; Networking, Sensing and Control (ICNSC), 2010 International Conference on; Digital Object Identifier: 10.1109/ICNSC.2010.5461545 Publication Year: 2010 , pp. 62-66.*

Dynamics simulations of virtual prototypes of double crank ring-plate-type pin-cycloidal gear planetary drive with three gears Junhua Bao; Weidong He;Computer Application and System Modeling (ICCASM), 2010 International Conference on; vol. 2 Digital Object Identifier: 10.1109/ICCASM.2010.5620810; Pub Year: 2010 , pp. V2-332-V2-336.*

* cited by examiner

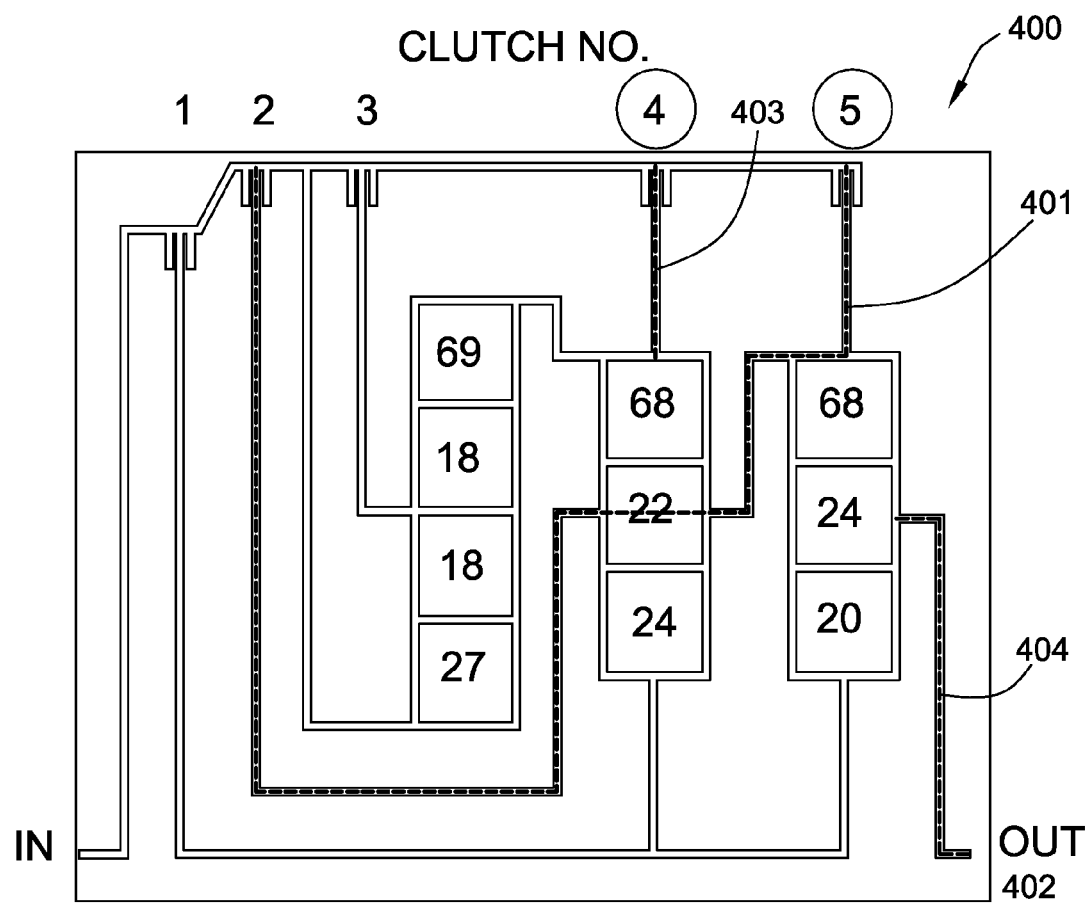

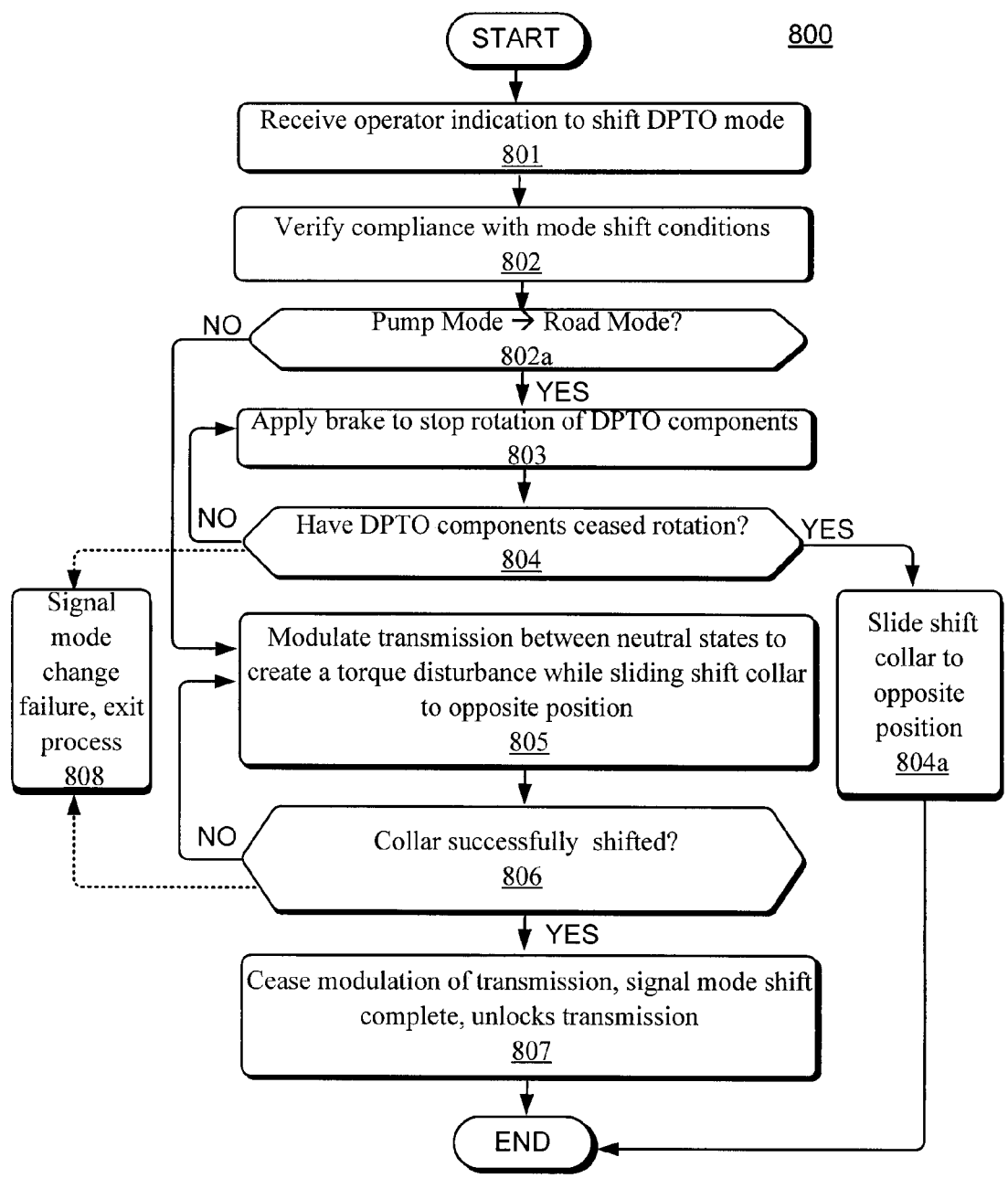

DRIVE LINE TORQUE PERTURBATION FOR PTO MODE SHIFTING

TECHNICAL FIELD

This patent disclosure relates generally to drive line PTO transmissions, and, more particularly to a system and method for minimizing input torque to a drive line PTO transmission to facilitate mode shifts.

BACKGROUND

Many powered machines use a single power source for multiple uses. For example, a riding lawn mower may use its engine for both locomotion of the machine as well as driving an implement such as a mulcher, mower, or tiller. On a larger scale, a fire response machine may use its engine for locomotion as well as to power an auxiliary device such as a water pump. Such machines typically employ a power takeoff, or PTO, to selectively direct the engine power to the machine wheels for locomotion or to the implement, e.g., the pump. In some cases the PTO is configured to select either the locomotion function or the auxiliary device, but not both. For example, with respect to a fire response machine, the locomotion function is not needed while pumping water, e.g., when fighting a fire, and the water pumping feature is not needed while moving, e.g., while traveling to the scene of a fire.

One such PTO is referred to a driveline PTO (DPTO) or a split-shaft PTO. An example of a DPTO is shown in US Published Application 2007/0006572 to Yu et al., entitled "System and Method for Controlling an Engine Having a Power Take Off Output Device." In general, a DPTO allows a machine transmission to deliver power to a PTO load through the machine's transmission output shaft (i.e., "pump mode") instead of delivering power to the machine wheels (i.e., "road mode"). In the DPTO system, one output yoke of the DPTO is linked to the machine axles and another output yoke is linked to the water pump. An input yoke of the DPTO receives power from the machine engine via the machine's transmission output shaft. This type of PTO provides certain benefits over other types of PTO such as side-drive PTO's, which typically provide less power than the DPTO, and front and rear engine PTO's, which often do not fit well within the physical layout of a typical fire response machine.

Most DPTOs include a split shaft sliding collar to selectively shift between road mode and pump mode. However, essentially all planetary transmissions provide some amount of incidental or windage generated torque at the output shaft even when in neutral. Thus, the sliding collar may be "torque locked" if too much torque is present when trying to slide the collar to change modes. Moreover, when shifting from pump mode to drive mode, if the windage generated torque at the output shaft is sufficient at engine idle to spin the pump, the operator may experience gear "grinding" as the rotating collar is forced against the stationary machine drive shaft. Although it is possible to use a clutched input to the DPTO to alleviate certain of these problems, this solution is costly and introduces additional mechanical complications and failure points into the system.

The foregoing background discussion is intended solely to aid the reader. It is not intended to limit the disclosure, and thus should not be taken to indicate that any particular element of a prior system is unsuitable for use within the disclosed examples, nor is it intended to indicate any element, including solving the motivating problem, to be essential in implementing the examples described herein. The full scope of the implementations and application of the examples described herein are defined by the appended claims.

BRIEF SUMMARY OF THE DISCLOSURE

In one aspect, a method is provided for controlling a machine drive having an engine linked to a driveline PTO via a transmission. The transmission supports at least two neutral conditions, and the driveline PTO supports a first mode, e.g., wherein the transmission output is linked to one or more wheels of the machine to move the machine, and a second mode, e.g., wherein the transmission output is linked to an auxiliary device rather than to the machine wheels. More generally, the disclosure applies to PTO shifts between any two modes as will be appreciated by those of skill in the art. When a request is received, e.g., from an operator, to shift the driveline PTO from a first mode to a second mode, the transmission is automatically modulated between its first neutral condition and its second neutral condition while the driveline PTO is shifted from the first mode to the second mode.

BRIEF DESCRIPTION OF THE DRAWINGS

FIG. 7 is a clutch diagram showing the logical structure of an exemplary machine planetary gear transmission in a clutch 5 neutral state braked by clutch 4; and FIG. 8 is a flow chart illustrating a process for transmission control according to an illustrative example.

DETAILED DESCRIPTION

Figure 1:
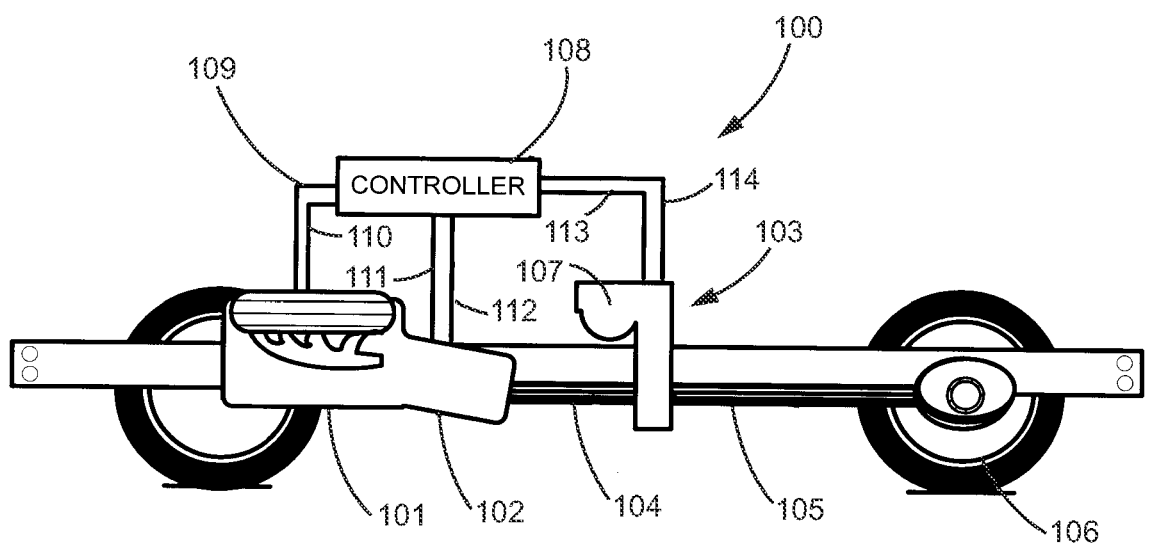
FIG. 1 is a schematic diagram of a transmission system including a DPTO.

This disclosure describes a system for facilitating mode changes in a DPTO by overcoming torque locking that often make mode changes difficult. FIG. 1 is a schematic diagram of a machine power system 100 including a DPTO usable in conjunction with examples described herein. The power system 100 comprises primarily a power source such as an engine 101, a transmission 102, and a DPTO 103. The transmission 102 includes an output shaft 104 that is linked to an input of the DPTO 103. The DPTO 103 includes two outputs, one of which is connected to the machine drive shaft 105, which operates the machine wheels 106. The other output of the DPTO 103 is connected to an auxiliary device, e.g., a water pump 107. Finally, the power system 100 also comprises a controller 108, linked to the engine 101, transmission 102, and DPTO 103 via sensors and or actuators to control the operation of the system 100.

Referring again to FIG. 1, the controller 108 may include one or more engine operation sensor inputs 109 and/or engine control outputs 110, one or more transmission operation sensor inputs 111 and/or transmission control outputs 112, and one or more DPTO operation sensor inputs 113 and/or DPTO control outputs 114. The controller 108 is actuated via an included processor adapted to execute the steps and calculations described herein. The controller, through the processor may operate by executing computer-executable code, i.e., instructions, stored on a computer-readable medium such as ROM, RAM, flash, and other types of media, whether optical, magnetic, or electronic.

Figure 2:
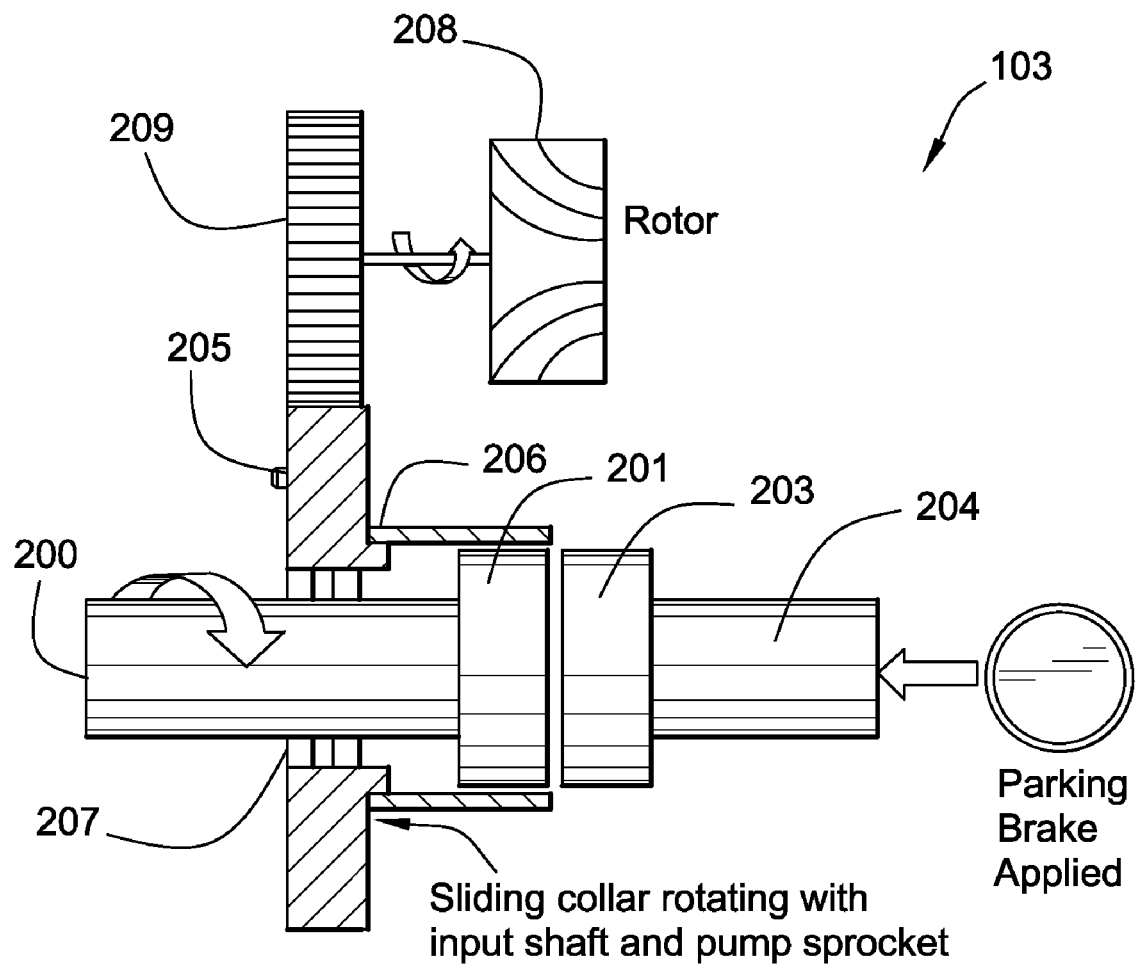
FIG. 2 is a schematic diagram of a DPTO in an example wherein the DPTO is in pump mode.

As discussed above, the DPTO 103 is shiftable between two modes, for example a "road mode" and a "pump mode." In the illustrated example, the engine 101 drives the wheels 106 of the machine in road mode (a first mode), and drives the water pump 107 in pump mode (a second mode). The illustration of FIG. 2 shows a detailed schematic diagram of the DPTO 103 when the DPTO 103 is configured in pump mode. The DPTO 103 comprises an input shaft 200 for receiving rotary power from the transmission output shaft. The input shaft 200 is fixed to an input gear 201 such that the input shaft 200 and the input gear 201 rotate as a unit.

The DPTO 103 in the illustrated example further includes a shift collar 202 that is slidable to link the input gear 201 to either an output gear 203 of an output shaft 204 or to a pump input gear 205 via a drive gear 206. The input shaft 200 is maintained concentrically with the pump input gear 205 via a bearing or bushing 207. The shift collar bears internal lands and grooves configured to mate with the teeth of input gear 201 while it mates with output gear 203 or drive gear 206 so as to selectably fix the input gear 201 to output gear 203 or drive gear 206 depending upon the mode of the DPTO 103. In the illustrated example, the shift collar 202 is in a position to fix the input gear 201 to the drive gear 206. In this configuration, the rotation of the input shaft 200 is transferred via the shift collar 202 to the drive gear 206 and the pump input gear 205, thus driving the pump 208 via gear 209. It will be appreciated that other gearing arrangements are possible within the disclosed principles.

Figure 3:
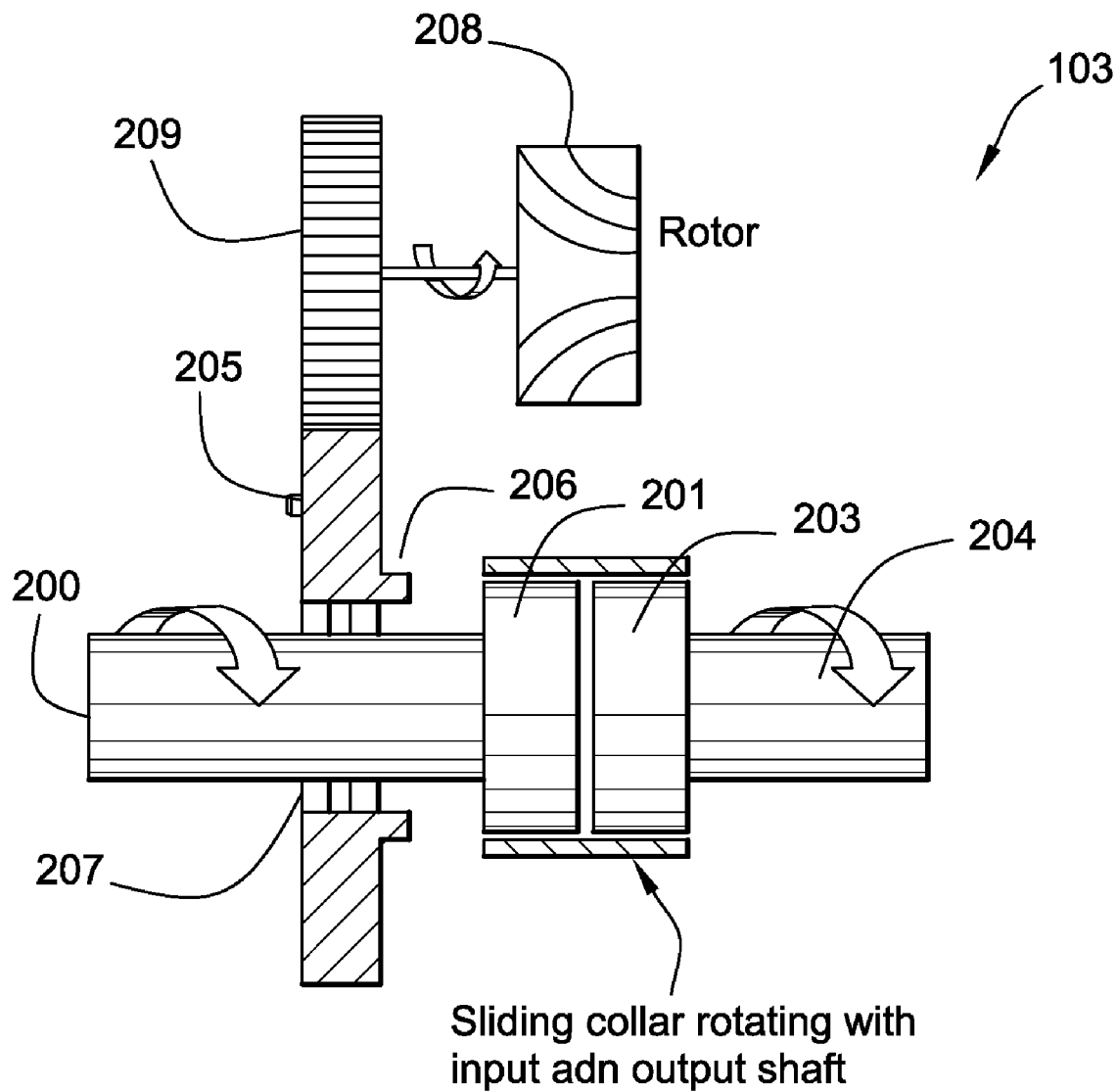
FIG. 3 is a schematic diagram of a DPTO in an example wherein the DPTO is in road mode.

When the shift collar 202 is slid out of engagement with drive gear 206 and into engagement with output gear 203, the DPTO 103 is considered to be in road mode, in that the motion of input shaft 200 is transferred via shift collar 202 to the output shaft 204. FIG. 3 is a schematic diagram of the DPTO 103 when in road mode. It can be seen that shift collar 202 links the input shaft 200 to the output shaft 204. At the same time, in this mode the pump drive gear 206 is not connected to the vehicle transmission and is free to coast. This mode is useful, for example, when the machine housing the DPTO 103 is traveling rather than performing auxiliary functions such as pumping.

In general, the engine 101 of the machine 100 is idling at such time as the user or operator requests a shift from one DPTO mode to the other. Indeed, it is desirable to minimize the engine speed in many cases to avoid component strain when shifting, and so an interlock may be used to assure that a DPTO shift is not executed when the engine speed and/or torque are excessive. However, even with the engine 101 at idle and the transmission 102 in a neutral gear, there is generally a certain amount of torque transmitted through the transmission 102. Indeed, essentially all planetary transmissions provide some amount of incidental or windage generated torque at the transmission output shaft (i.e., the input shaft 200) even when in neutral. The windage torque can be significant, and has been measured to be as high as 30 Nm.

This incidental torque causes a number of problems, one of which is known as "torque lock." Torque lock occurs when the shift collar 202 cannot be slidably disengaged from its present arrangement to change modes because too much torque is present between the shift collar 202 and a mating element. The friction between the mating surfaces of the shift collar 202 and a driven surface is essentially proportional to the force between the surfaces, which is proportional to the applied torque. Thus, in any mode, when excess torque is present, excess sliding friction with respect to the shift collar 202 is also present, increasing the difficulty of, or even preventing, shifting between modes.

Moreover, in an example when shifting from pump mode to drive mode, if the windage generated torque at the transmission output shaft 200 is sufficient at engine idle to spin the pump 208, the operator may experience gear "grinding" as the rotating collar 202 is forced against the stationary machine output gear 203. This phenomenon can be both damaging to the machine 100 and disconcerting to the operator.

In an embodiment, the windage torque of the transmission 102 is overcome to allow mode shifts without first shifting to a non-neutral transmission state such as reverse. In particular, a calculated train of torque pulses is applied during a mode shift by way of a deliberate series of shifts between multiple neutral states. The shifts between neutral states periodically build and release internal inertial forces within transmission 102 due to the differences in rotating and stationary elements in each state. The disturbance thus created at the shift collar releases the friction of engagement and allows the shift collar 202 to be moved into engagement with an alternative mating element, thus executing a mode shift.

Although an operator may rapidly alternate between first gear and reverse to allow a DPTO shift, this will pose a risk of unintended vehicle motion. The illustrated example substantially eliminates this risk, since it entails using internal inertia to generate torque disturbances, and does not, in the preferred embodiment, actually place the transmission in a drive gear to create a torque disturbance.

Figure 4:
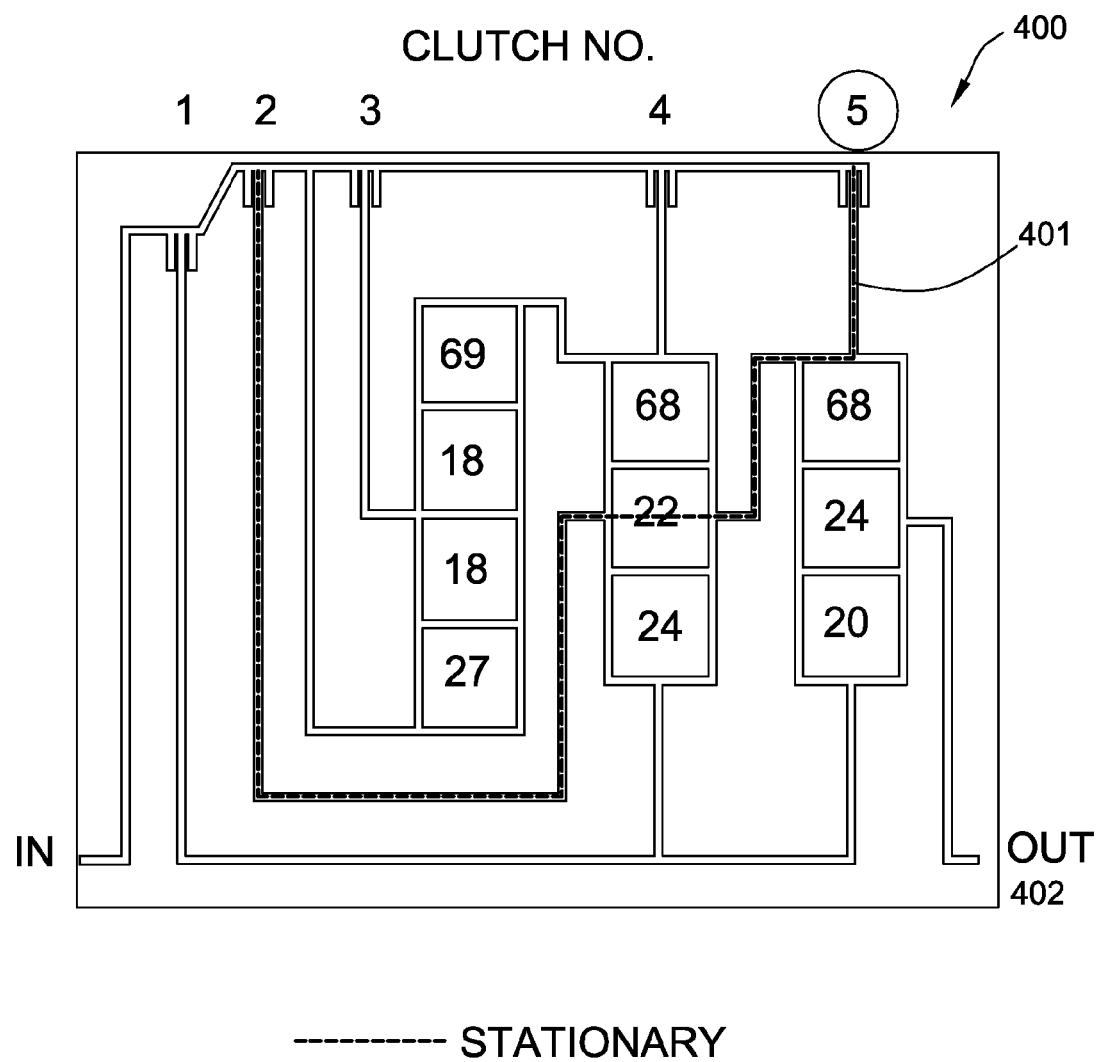
FIG. 4 is a clutch diagram showing the logical structure of an exemplary machine planetary gear transmission in a clutch 5 neutral state.

To understand the affect of using multiple neutral states, the logical structure of an exemplary five clutch planetary gear transmission 400 is shown in the clutch diagram of FIG. 4. In the illustrated example, the transmission 400 is engaged in a clutch 5 neutral state, causing certain elements to rotate and others to stay stationary. In the illustrated example, the elements along the dotted path 401 are stationary in the clutch 5 neutral state.

Figure 5:
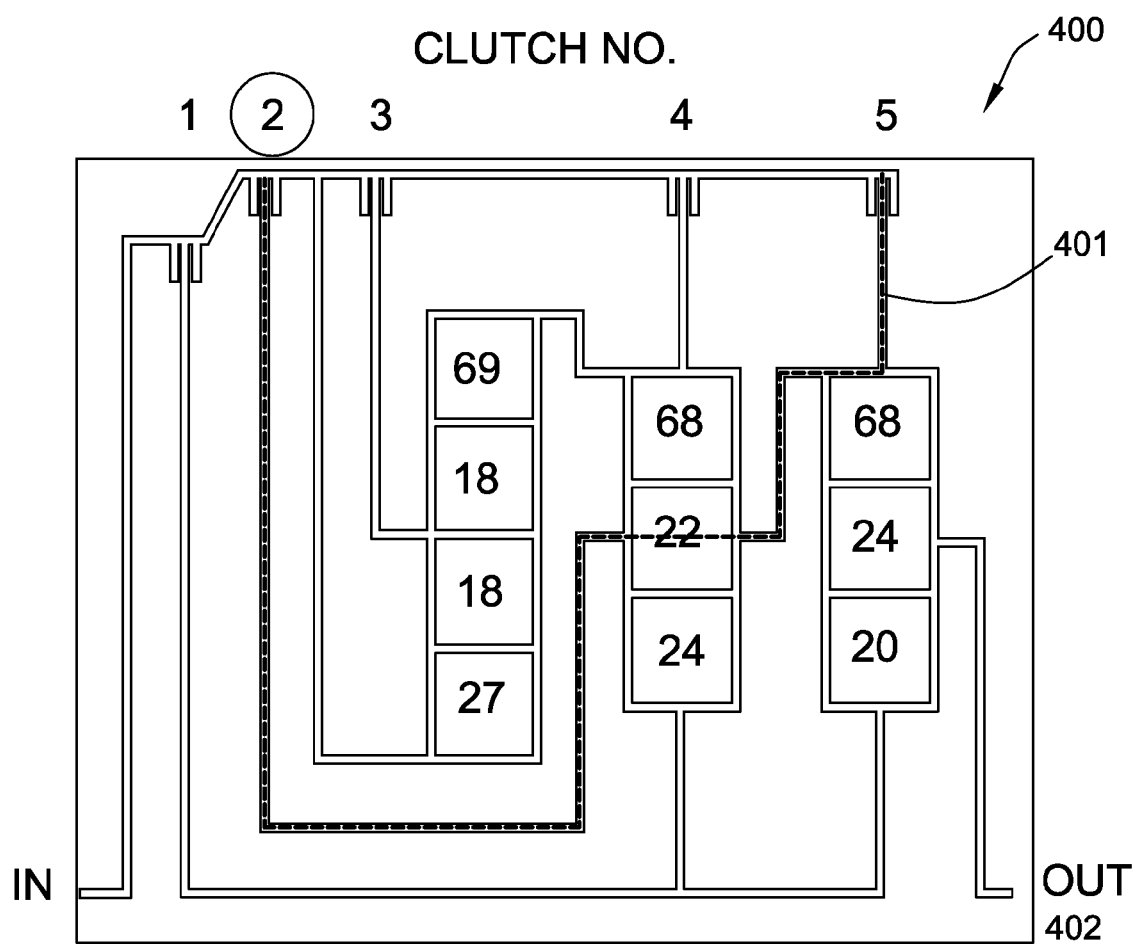
FIG. 5 is a clutch diagram showing the logical structure of an exemplary machine planetary gear transmission in a clutch 2 neutral state.

FIG. 5 is a schematic diagram of the logical structure of an example five clutch planetary gear transmission 400, wherein the transmission 400 is engaged in a clutch 2 neutral state. In the illustrated example, the elements along the dotted path 401 are now rotating rather than stationary. The rotating elements along path 401 have angular momentum that is released when the transmission 102 is shifted from the clutch 2 neutral state to the clutch 5 neutral state. In other words, a change in torque is required to change angular momentum. Increasing the momentum of link 401 results in a positive torque impulse at the output shaft 104 (engaging clutch 2). Reducing the momentum of link 401 results in a negative torque impulse at the output shaft 104 (engaging clutch 5).

Figure 6:
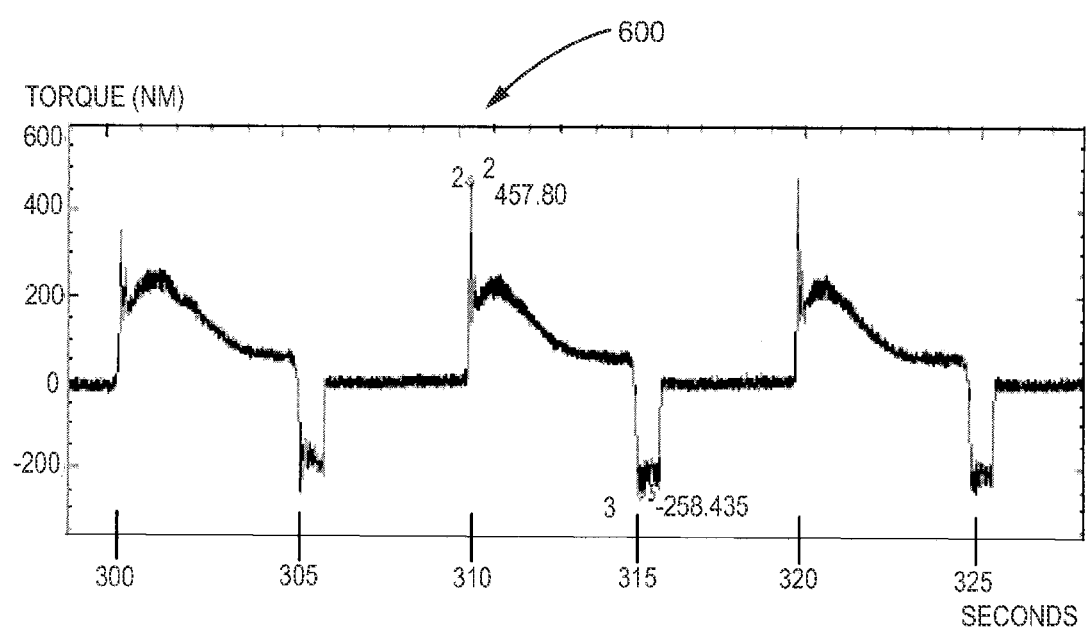
FIG. 6 is a timing diagram showing torque perturbations or disturbances according to an aspect of the disclosed system.

Thus, shifting back and forth between two differently clutched neutral states provides an alternating positive/negative torque at the transmission output shaft 104. FIG. 6 is a timing diagram 600 illustrating the torque pulse train created by alternating between the clutch 2 neutral state and the clutch 5 neutral state. The vertical axis denotes transmission output torque in Nm, while the horizontal axis represents elapsed time in seconds. It can be seen that the positive torque pulses rise to a magnitude of approximately 200 Nm and decay gradually within approximately 3 seconds, while the negative torque pulses rise to similar magnitude but decay sharply within approximately 1.5 seconds.

As noted above, the axial friction experienced by the shift collar 202 is proportional to the torque at the DPTO input shaft 200 (i.e., transmission output shaft 104 in the illustrated example). Thus, the axial friction experienced by the shift collar 202 during the torque pulse train is of the same shape as the timing diagram 600. This periodic disruption of the axial torque allows the shift collar 202 to begin moving with less effort and to then continue moving once the static axial friction of the shift collar 202 is overcome.

In an embodiment, one or more clutches of the transmission 102 are used to brake the transmission output 402 (shaft 104) when shifting the DPTO 103 from pump mode to road mode. In particular, the windage torque of the transmission 102 is often sufficient to turn the pump, especially when the pump is dry, raising the possibility of gear grinding when shifting the DPTO 103 back to road mode.

Thus, in a further embodiment, an additional clutch is activated to brake the transmission output 402 (shaft 104) just prior to a shift of the DPTO 103 from pump mode to road mode. In the illustrated example, the number four clutch, when activated during a clutch 5 neutral state, causes the output 402 (shaft 104) to cease rotating. In particular, once two elements of a planetary train are stationary (e.g., along paths 401 and 403), the third element (e.g., along path 404), which in this case includes the output 402, must also be stationary.

The principles described above may be applied in a wide variety of shift sequences and processes. An exemplary DPTO shift process 800 is illustrated via the flowchart of FIG. 8. Initially at stage 801, the process receives an operator indication, such as via user interface 115 to shift the mode of the DPTO 103. The process checks the transmission state at stage 802 to verify that requirements for the mode change are met. For example, the transmission should preferably be in a neutral gear, and the speed of any rotating components associated with the DPTO should less than a certain amount, e.g., 175 RPM. This prevents excessive component stress, e.g., clutch wear or damage during shifts.

At stage 802a, the process determines whether the requested shift is from pump mode to road mode. If so, the process flows to stage 803, wherein it applies a brake such as a transmission brake to stop the rotation of components associated with the DPTO 103. For example, if the DPTO 103 input shaft 200 and pump 208 are rotating, it is desirable to stop these elements prior to the mode change. A suitable transmission brake system is discussed above with respect to FIG. 7, but other suitable braking devices or processes may be used instead.

The process verifies at stage 804 that the components associated with the DPTO 103 have ceased rotation. If the components have not ceased rotation, the process may loop back to stage 803 to continue braking. Optionally, after a predetermined number of loops, e.g., 3, between stages 804 and 803, the process may signal a mode change failure at stage 808 and exit. Once effective braking has been confirmed at stage 804, the process flows to stage 804a and slides the shift collar from its current position to the alternate position and exits.

If at stage 802a it is instead determined that the requested shift is from road mode to pump mode, the process flows to stage 805 and begins to periodically modulate the transmission 102 gear between its current neutral state and a second neutral state to create a torque disturbance while sliding the shift collar 202 from its current position to the opposite position. At stage 806, the process verifies that the collar 202 has been shifted. Stage 806 may be repeated a predetermined number of times, e.g., 3 times, and if the collar 202 still has not been successfully shifted, the process may signal a mode change failure at stage 808 and exit.

Otherwise, at stage 807, the process ceases the modulation of the transmission 103 between neutral states, signals via the user interface 115 that the mode shift is complete, and unlocks the transmission 103, i.e., allows the operator to shift to transmission gears other than neutral.

Industrial Applicability

The industrial applicability of the DPTO shift control system described herein will be readily appreciated from the foregoing discussion. The present disclosure is applicable to machines having a driveline and having associated therewith a Driveline PTO (DPTO), examples of such machines are certain machines such as fire response machines that provide both locomotion and auxiliary services such as the pumping of water, operation of a tool or implement, etc. The described system and technique allows for easier shifting between a road mode, wherein the machine driveline is used for propulsion, and another mode, e.g., a pump mode, where the machine driveline is instead used to power the auxiliary function. For example, a fire response machine that employs a DPTO to power a water pump may benefit from application of the teachings herein. In such machines, application of the foregoing teachings can provide increased drive train and DPTO longevity and ease of operation by minimizing the torque lock encountered when shifting between road mode and pump mode. The described system allows the operator of such a machine to automatically overcome torque locking without shifting the machine transmission to determine a setting wherein the torque locking is alleviated or minimized. Thus, for example, when a fire response machine arrives at a fire incident scene, it will arrive in road mode. However, once stationary, the machine will be able to quickly shift via the DPTO into pump mode and supply water to one or more hoses and nozzles to be directed toward the fire. Similarly, when the fire response machine has completed its task at the fire scene, it is able to quickly revert back to road mode and begin movement to another incident or back to a firehouse or other storage facility.

It will be appreciated that the foregoing description provides examples of the disclosed system and technique. However, it is contemplated that other implementations of the disclosure may differ in detail from the foregoing examples. All references to examples herein are intended to reference the particular example being discussed at that point and are not intended to imply any limitation as to the scope of the disclosure or claims more generally. All language of distinction and disparagement with respect to certain features is intended to indicate a lack of preference for those features, but not to exclude such from the scope of the claims entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure contemplates the inclusion of all modifications and equivalents of the subject matter recited in the appended claims as permitted by applicable law. Moreover, any combination of the above-described elements in all possible variations thereof is contemplated unless otherwise indicated herein or otherwise clearly contradicted by context.

We claim:

1. A method of controlling a machine drive having an engine linked to a driveline PTO via a transmission, wherein the transmission has an output and is adapted to selectively provide at least two neutral conditions and the driveline PTO is adapted to shift between a first mode wherein the transmission output is linked to one or more wheels of the machine for movement of the machine, and a second mode wherein the transmission output is linked to an auxiliary device rather than to the one or more wheels of the machine, the method comprising:
   receiving a request from an operator of the machine to shift the driveline PTO from a current one of the first and second modes to a requested one of the first and second modes;
   determining whether the current mode is the first or second mode; and
   automatically modulating the transmission between a first neutral condition and a second neutral condition if the current mode is the first mode and shifting the driveline PTO from the current one of the first and second modes to the requested one of the first and second modes while modulating the transmission between the first neutral condition and the second neutral condition.

2. The method according to claim 1, further comprising verifying compliance with at least one predetermined driveline PTO shift criterion.

3. The method according to claim 2, wherein the step of verifying compliance with at least one predetermined driveline PTO shift criterion further includes verifying that the transmission is in a neutral condition.

4. The method according to claim 2, wherein the step of verifying compliance with at least one predetermined driveline PTO shift criterion further includes verifying that a rotating component associated with the driveline PTO is rotating at less than a predetermined speed.

5. The method according to claim 1, further comprising applying a brake to stop rotation of a component associated with the driveline PTO if it is determined that the current mode is the second mode.

6. The method according to claim 5, wherein the transmission is clutch actuated and wherein applying a brake to stop rotation of the component associated with the driveline PTO includes applying a clutch of the transmission.

7. The method according to claim 1, wherein the auxiliary device includes a water pump.

8. The method according to claim 1, wherein the driveline PTO is adapted to shift between the first mode and the second mode via a slidable shift collar adapted to continually engage the transmission output and to also engage a first component linked to the machine wheels when the shift collar is in a first position and a second component linked to the auxiliary device when the shift collar is in a second position.

9. A controller for controlling a machine drive having an engine linked to a driveline PTO via a transmission, wherein the transmission has an output and is adapted to selectively provide at least two neutral conditions and the driveline PTO is adapted to shift between a first mode wherein the transmission output is linked to one or more wheels of the machine for movement of the machine, and a second mode wherein the transmission output is linked to an auxiliary device rather than to the one or more wheels of the machine, the controller comprising:
   an operator interface input for receiving a request from an operator of the machine to shift the driveline PTO from a current one of the first and second modes to a requested one of the first and second modes;
   a transmission control output for determining whether the current mode is the first mode and automatically modulating the transmission between a first neutral condition and a second neutral condition if the current mode is the first mode; and
   a PTO control output for shifting the driveline PTO from the current one of the first and second modes to the requested one of the first and second modes.

10. The controller according to claim 9, further including at least one sensor input for verifying compliance with at least one predetermined driveline PTO shift criterion.

11. The controller according to claim 10, wherein verifying compliance with at least one predetermined driveline PTO shift criterion further includes verifying that the transmission is in a neutral condition.

12. The controller according to claim 10, wherein verifying compliance with at least one predetermined driveline PTO shift criterion further includes verifying that a rotating component associated with the driveline PTO is rotating at less than a predetermined speed.

13. The controller according to claim 9, wherein the transmission control output is further operable to automatically apply a brake to stop rotation of a component associated with the driveline PTO if the current mode is the second mode.

14. The controller according to claim 13, wherein the transmission is clutch actuated and wherein applying a brake to stop rotation of the component associated with the driveline PTO includes applying a clutch of the transmission.

15. The controller according to claim 9, wherein the auxiliary device includes a water pump.

16. The controller according to claim 9, wherein the PTO control output is further operable to shift the driveline PTO between modes by moving a shift collar linked to the transmission output into one of a first and second position, wherein in the first position the shift collar engages a first component linked to the machine wheels and in the second position the shift collar engages a second component linked to the auxiliary device.

17. A controller for controlling the operation of a transmission having a DPTO associated therewith, the controller including a computer-readable medium having thereon computer-readable instructions comprising:
   instructions for detecting a request to shift the DPTO from a first mode to a second mode and determining whether the current mode is a road mode; and
   instructions for modulating the transmission automatically between a first gear and second gear while the DPTO is shifted from the first mode to the second mode if the current mode is a road mode.

18. The controller according to claim 17, wherein the computer-readable instructions further include instructions for detecting that a component of the transmission is rotating and applying a transmission brake if the current mode is not a road mode.

19. The controller according to claim 18, wherein the transmission is clutch actuated and wherein the computer-readable instructions for applying a transmission brake include instructions for applying a clutch of the transmission.

20. The controller according to claim 17, wherein the computer-readable instructions further include instructions for shifting the DPTO and for verifying compliance with at least one predetermined mode shift criterion prior to shifting the DPTO.

* * * * *